(12) United States Patent
Pettit

(10) Patent No.: US 12,580,774 B2
(45) Date of Patent: Mar. 17, 2026

(54) DIGITAL SIGNATURES OF MESSAGES USING SIGNATURE SHARES

(71) Applicant: nChain Licensing AG, Zug (CH)

(72) Inventor: Michaella Pettit, London (GB)

(73) Assignee: nChain Licensing AG, Zug (CH)

( * ) Notice: Subject to any disclaimer, the term of this patent is extended or adjusted under 35 U.S.C. 154(b) by 380 days.

(21) Appl. No.: 17/919,994

(22) PCT Filed: Apr. 19, 2021

(86) PCT No.: PCT/EP2021/060032
§ 371 (c)(1),
(2) Date: Oct. 19, 2022

(87) PCT Pub. No.: WO2021/213959
PCT Pub. Date: Oct. 28, 2021

(65) Prior Publication Data
US 2023/0163977 A1 May 25, 2023

(30) Foreign Application Priority Data

Apr. 23, 2020 (GB) ..................................... 2005953

(51) Int. Cl.
*H04L 29/06* (2006.01)
*H04L 9/08* (2006.01)
(Continued)

(52) U.S. Cl.
CPC .......... *H04L 9/3257* (2013.01); *H04L 9/0894* (2013.01); *H04L 9/14* (2013.01)

(58) Field of Classification Search
None
See application file for complete search history.

(56) References Cited

U.S. PATENT DOCUMENTS

| | | | |
|---|---|---|---|
| 7,434,046 B1 | 10/2008 | Srivastava | |
| 8,392,716 B2 | 3/2013 | Oishi | |
| (Continued) | | | |

FOREIGN PATENT DOCUMENTS

| | | |
|---|---|---|
| CN | 108964906 A | 12/2018 |
| WO | 2017145010 | 8/2017 |
| (Continued) | | |

OTHER PUBLICATIONS

Goldfeder, Steven and Arvind Narayanan. "Securing Bitcoin wallets via a new DSA / ECDSA threshold signature scheme." (2015). (Year: 2015).*

(Continued)

*Primary Examiner* — Jeffery L Williams
(74) *Attorney, Agent, or Firm* — Galvani Smith PLLC

(57) ABSTRACT

A computer-implemented method of generating a share of a digital signature of a message, wherein a threshold number of different signature shares from respective participants of a group of participants are required to generate the digital signature, wherein each participant has a respective private key share, the method being performed by a first one of the participants and comprising: generating a first message-independent component and a first message-dependent component, wherein the message-independent component is generated based on a first private key share and wherein the message-dependent component is generated based on the message; causing the first message-independent component to be made available to a coordinator; and causing a first signature share to be made available to the coordinator for generating the signature based on at least the threshold number of signature shares, wherein the first signature share comprises at least the message-dependent component.

19 Claims, 4 Drawing Sheets

(51) Int. Cl.
  *H04L 9/14* (2006.01)
  *H04L 9/32* (2006.01)

(56) References Cited

U.S. PATENT DOCUMENTS

| | | | | |
|---|---|---|---|---|
| 8,490,164 | B2 | 7/2013 | Takahashi et al. | |
| 9,680,654 | B2 | 6/2017 | Lam | |
| 11,063,754 | B2 | 7/2021 | Vakili et al. | |
| 11,716,617 | B2 | 8/2023 | Wentz | |
| 11,979,507 | B2 * | 5/2024 | Fletcher | H04L 9/3247 |
| 12,107,955 | B2 * | 10/2024 | Savanah | H04L 9/085 |
| 12,192,381 | B2 * | 1/2025 | Beery | H04L 9/3252 |
| 12,238,222 | B2 * | 2/2025 | Wright | H04L 9/3242 |
| 12,254,452 | B2 * | 3/2025 | Wright | G06Q 20/0658 |
| 2008/0270790 | A1 | 10/2008 | Brickell et al. | |
| 2010/0215172 | A1 * | 8/2010 | Schneider | H04L 9/085 |
| | | | | 713/171 |
| 2011/0208970 | A1 | 8/2011 | Brown et al. | |
| 2014/0325227 | A1 | 10/2014 | Brown | |
| 2016/0301526 | A1 | 10/2016 | Rietman et al. | |
| 2017/0324548 | A1 | 11/2017 | Anshel et al. | |
| 2018/0367298 | A1 * | 12/2018 | Wright | H04L 9/3247 |
| 2020/0084048 | A1 * | 3/2020 | Lindell | H04L 9/3255 |
| 2020/0274704 | A1 | 8/2020 | Matsui et al. | |
| 2021/0111875 | A1 | 4/2021 | Saint | |
| 2023/0015219 | A1 * | 1/2023 | Lam | H04L 9/3247 |
| 2023/0163977 | A1 * | 5/2023 | Pettit | H04L 9/3255 |
| | | | | 713/176 |
| 2024/0121109 | A1 | 4/2024 | Pettit | |

FOREIGN PATENT DOCUMENTS

| | | |
|---|---|---|
| WO | 2019166915 A1 | 9/2019 |
| WO | 2019193452 | 10/2019 |

OTHER PUBLICATIONS

Boneh, D., Gennaro, R., Goldfeder, S. (2019). Using Level-1 Homomorphic Encryption to Improve Threshold DSA Signatures for Bitcoin Wallet Security. In: Lange, T., Dunkelman, O. (eds) Progress in Cryptology—LATINCRYPT 2017. LATINCRYPT 2017. Lecture Notes in Computer Science( ), vol. 11368. (Year: 2017).*

Philip MacKenzie, Michael K. Reiter, "Two-party generation of DSA signatures", Jul. 21, 2004, Springer Verlag, p. 218-239. (Year: 2004).*

Philip MacKenzie, Michael K. Reiter, "Two-Party Generation of DSA Signatures (Extended Abstract)", Advances in Cryptology—CRYPTO 2001, Aug. 2001, p. 1-18. (Year: 2001).*

Catrina O., et al., "Fostering the Uptake of Secure Multiparty Computation in E-Commerce," 2008 Third International Conference on Availability, Reliability and Security (ARES 08), Mar. 4, 2008, XP031257563, pp. 693-700.

Gennaro R., et al., "Threshold-optimal DSA/ECDSA Signatures and an Application to Bitcoin Wallet Security," LNSC, Applied Cryptography and Network Security (ACNS2016), Jun. 9, 2016, vol. 9696, pp. 156-174.

PCT/EP2021/060032 International Search Report and Written Opinion dated Sep. 9, 2021, 15 pages.

Anders Dalskov et al: "Securing DNSSEC Keys via Threshold ECDSA From Generic MPC", IACR, International Association for Cryptologic Research vol. 20190805:221846 Aug. 5, 2019 (Aug. 5, 2019), pp. 1-24, XP061033215, Retrieved from the Internet: URL: http://eprint.iacr.org/2019/889.pdf [retrieved on Aug. 2, 2019].

Dikshit Pratyush et al: "Efficient weighted threshold ECDSA for securing bitcoin wallet", 2017 ISEA Asia Security and Privacy (ISEASP), IEEE, Jan. 29, 2017 (Jan. 29, 2017), pp. 1-9, XP033117504, DOI: 10.1 109/ISEASP.2017.7976994 [retrieved on Jul. 12, 2017].

Marc Green et al: "Strength in Numbers: Threshold ECDSA to Protect Keys in the Cloud", IACR, International Association for Cryptologic Research, vol. 20151205:042955, Dec. 4, 2015 (Dec. 4, 2015), pp. 1-19, XP061019773, [retrieved on Dec. 4, 2015].

Gennaro, R, et al. "Robust threshold DSS signatures." International Conference on the Theory and Applications of Cryptographic Techniques. Springer, Berlin, Heidelberg, 1996.

Gennaro, R, and Goldfeder, S. "Fast multiparty threshold ECDSA with fast trustless setup." Proceedings of the 2018 ACM SIGSAC Conference on Computer and Communications Security, 2018.

* cited by examiner

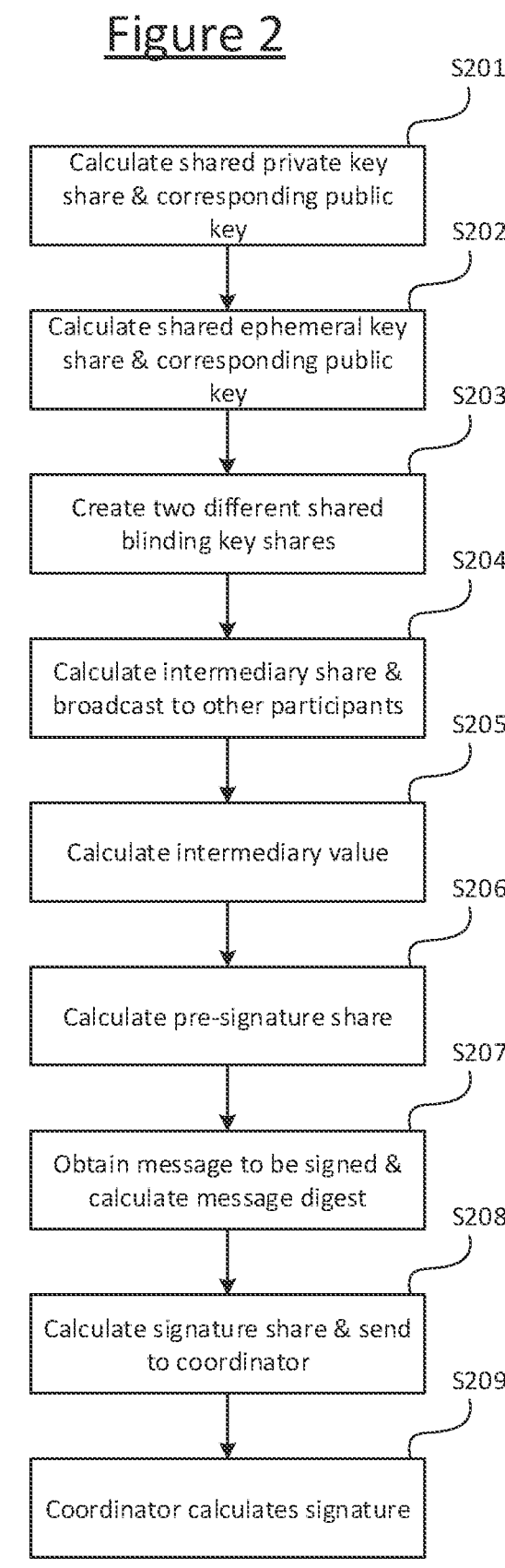

S201
Calculate shared private key
share & corresponding public
key

S202
Calculate shared ephemeral key
share & corresponding public
key

S203
Create two different shared
blinding key shares

S204
Calculate intermediary share &
broadcast to other participants

S205
Calculate intermediary value

S206
Calculate pre-signature share

S207
Obtain message to be signed &
calculate message digest

S208
Calculate signature share & send
to coordinator

S209
Coordinator calculates signature

$TxID_0$ $TxID_1$

| Input(s) | Output(s) |
|---|---|
| Input <br> • Pointer to previous $Tx$ <br> • Index of UTXO in previous $Tx$ <br> • Unlocking script for unlocking from previous party <br><br> ⋮ <br><br> Optional further inputs <br><br> ⋮ | $UTXO_0$ <br> • Amount <br> • Locking script locking to Alice <br><br> ⋮ <br><br> Optional further $UTXO$s <br><br> ⋮ |

203

202

| Input(s) | Output(s) |
|---|---|
| Input <br> • Pointer to $Tx_0$ <br> • Index of $UTXO_0$ [within $Tx_0$] <br> • Unlocking script for unlocking $UTXO_0$ from Alice <br><br> ⋮ <br><br> Optional further inputs <br><br> ⋮ | $UTXO_1$ <br> • Amount <br> • Locking script locking to Bob <br><br> ⋮ <br><br> Optional further $UTXO$s <br><br> ⋮ |

Transaction
from Alice to Bob

Validated by running the locking
script from output of $Tx_0$, together
with the unlocking script from $Tx_1$.
This checks that the unlocking
script in $Tx_1$ meets the condition(s)
defined in the locking script in $Tx_0$.

400

S401

Generate a message-independent component of a signature share

S402

Generate a message-dependent component of a signature share

S403

Cause the message-independent component to be made available to a coordinator

S404

Cause a signature share generated based on at least the message-dependent component to be made available to the coordinator

DIGITAL SIGNATURES OF MESSAGES USING SIGNATURE SHARES

CROSS REFERENCE TO RELATED APPLICATIONS

This application is the U.S. National Stage of International Application No. PCT/EP2021/060032 filed on Apr. 19, 2021, which claims the benefit of United Kingdom Patent Application No. 2005953.1, filed on Apr. 23, 2020, the contents of which are incorporated herein by reference in their entireties.

TECHNICAL FIELD

The present disclosure relates to a method of generating a share of a digital signature of a message, and to a method of generating a digital signature of a message using signature shares.

BACKGROUND

Public-key cryptography is a type of cryptographic system that uses pairs of keys: private keys which are known only to the owner of the private key, and public keys which are generated based on the corresponding private key and which may be disseminated without compromising the security of the private key.

Public-key cryptography enables a sender to encrypt a message using a recipient's public key (i.e. the public key corresponding to a private key known only to the recipient). The encrypted message can then only be decrypted using the recipient's private key.

Similarly, a sender can use their own private key to sign a message, e.g. to prove that the message is being sent by the sender, and/or to indicate that the sender agrees with the message. The signer (i.e. the party generating the signature) uses their private key to create a digital signature on the message. Anyone with the signer's corresponding public key can use the same message and the digital signature on the message to verify whether the signature was validly created, i.e. whether the signature was indeed made using the signer's private key.

A digital signature scheme typically involves three procedures, i.e. algorithms. A key generation algorithm is used to generate a random private key and a corresponding public key. A signing algorithm is used to generate a signature based on a message and the private key. A verification algorithm is used to verify, given a public key and the message, whether the signature has been generated using the corresponding private key and according to the signing algorithm.

A threshold signature scheme allows a threshold number of participants in a group to create a digital signature on (or of) a message using individual shares of a shared private key. Here, a digital signature is a signature which is generated based on the message to be signed. In such a scheme, the signature can only be created if the threshold number of participants agree to generate the signature on the message. Any attempt to generate a signature using a smaller number of participants will not generate a valid signature. Therefore, a valid signature by the group (i.e. one generated using the message and the shared private key) provably had the threshold number of people agree to generate the signature. This also implies that any adversary needs to obtain the threshold number of shares of the private key to forge a signature with that private key.

A common feature of threshold signature shares is that if any of the private key shares are lost, the private key can still be recoverable provided that the threshold number of shares are still available.

One particular digital signature algorithm is the Elliptic Curve Digital Signature Algorithm (ECDSA). There are two common threshold schemes for ECDSA signature. One threshold ECDSA scheme is a non-optimal scheme where a group collectively own a shared private key with a threshold of t+1, but creating a signature requires a higher threshold of 2t+1. For a detailed description see Gennaro, R, et al., "Robust threshold DSS signatures", *International Conference on the Theory and Applications of Cryptographic Techniques*, Springer, Berlin, Heidelberg, 1996. This scheme is referred to below as the "non-optimal Gennaro scheme".

The other common threshold ECDSA scheme is an optimal scheme, where optimal means that the threshold to create a signature is the same as that of the shared private key. For a detailed description see Gennaro, R, and Goldfeder, S., "Fast multiparty threshold ECDSA with fast trustless setup", *Proceedings of the* 2018 *ACM SIGSAC Conference on Computer and Communications Security,* 2018. This scheme is referred to below as the "optimal Gennaro scheme".

SUMMARY

The advantage of the non-optimal Gennaro scheme is that it is efficient in terms of both computation, and communication rounds. The disadvantage is that the threshold for creating the private key is smaller than the threshold for generating a digital signature. A problem with this is that one cannot be certain that the threshold number of participants came together to sign. That is, since a signature can be calculated using the private key, a number of participants smaller than the threshold for generating the signature can come together to sign a message using the private key, and not using a threshold signature. For instance, the threshold to generate a private key may be two, whereas the threshold to generate a signature may be three. In that case, two people can generate the private key and therefore a signature, thus avoiding the requirement of three people being required to generate a threshold signature.

In contrast, the advantage of the optimal Gennaro scheme is that there is no disparity in thresholds for generating private keys and signatures. However, in this scheme the computation and communication rounds are higher, the creation of a signature is slower, and the scheme does not scale well.

It would therefore be desirable for a threshold ECDSA scheme that has the computational, storage, and communication advantages of the non-optimal Gennaro scheme, whilst crucially being threshold optimal, like the optimal Gennaro scheme.

According to one aspect disclosed herein, there is provided a computer-implemented method of generating a share of a digital signature of a message, wherein a threshold number of different signature shares from respective participants of a group of participants are required to generate the digital signature, wherein each participant has a respective private key share, the method being performed by a first one of the participants and comprising: generating a first message-independent component and a first message-dependent component, wherein the message-independent component is generated based on a first private key share and wherein the message-dependent component is generated based on the message; causing the first message-independent component to be made available to a coordinator; and causing a first signature share to be made available to the coordinator for generating the signature based on at least the threshold number of signature shares, wherein the first signature share comprises at least the message-dependent component.

According to another aspect disclosed herein, there is provided a computer-implemented method of generating a digital signature of a message, wherein a threshold number of different signature shares from respective participants of a group of participants are required to generate the digital signature, wherein each participant has a respective private key share, the method being performed by a coordinator and comprising: obtaining at least a threshold number of respective message-independent components, wherein each respective message-independent component is generated based on a respective private key share; obtaining at least the threshold number of respective signature shares, wherein each respective signature share is based on at least a respective message-dependent component, and wherein each respective message-dependent component is generated based on the message; and generating the signature of the message based on each of the obtained signature shares and each of the obtained message-independent components.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
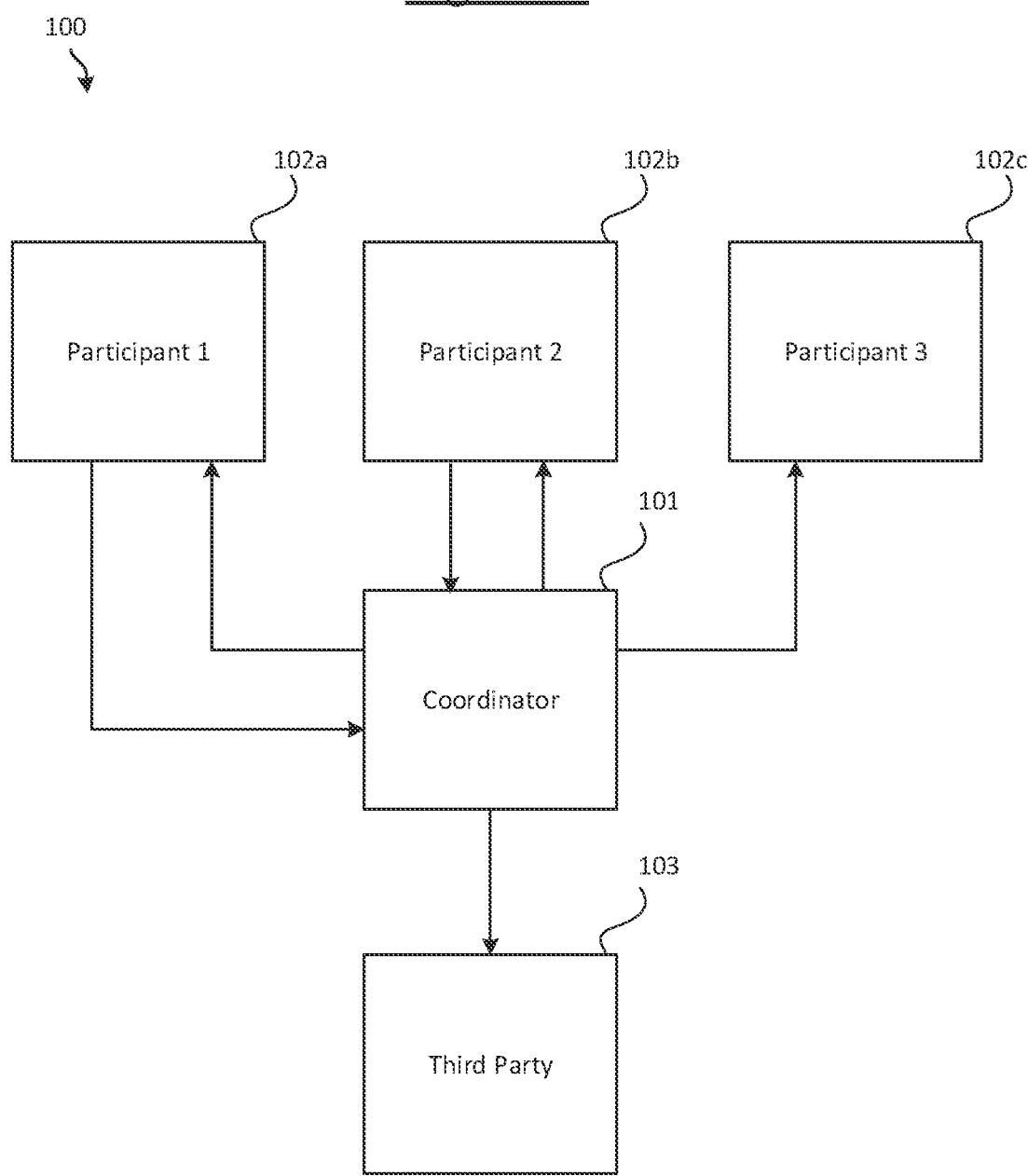
FIG. 1 schematically illustrates an example system for generating a signature of a message according to embodiments of the present invention, FIG. 2 schematically illustrates an example method for generating a signature share of a message according to embodiments of the present invention, and FIG. 3 schematically illustrates an example blockchain transaction protocol.
Figure 4:
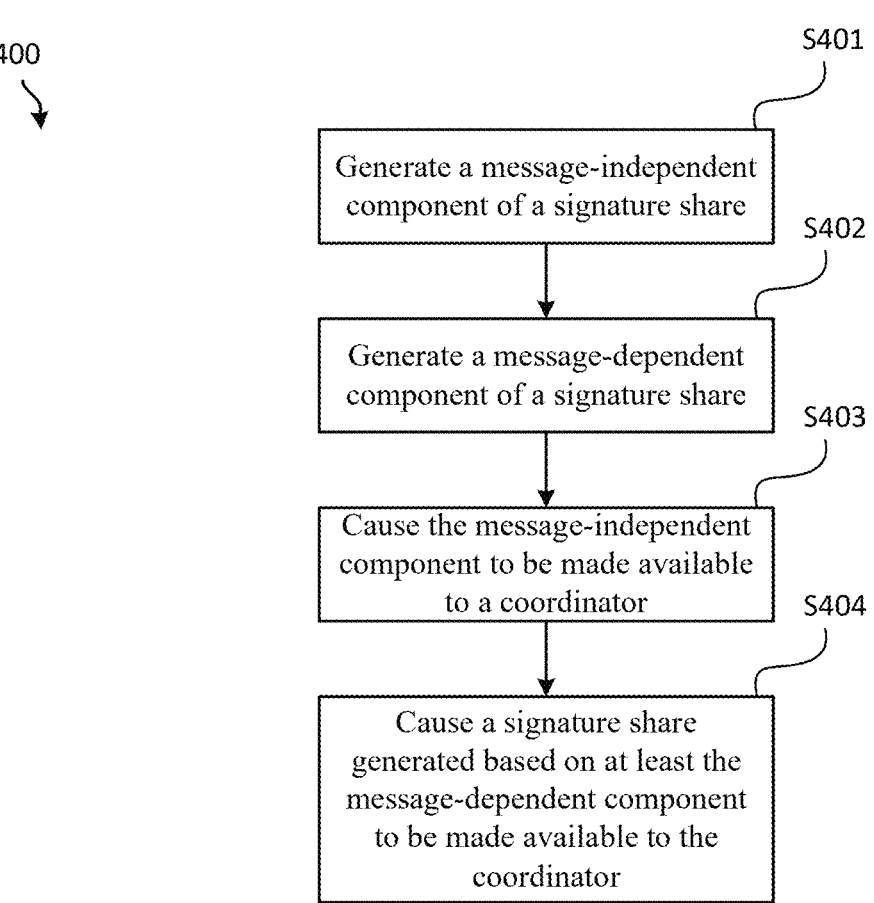
FIG. 4 schematically illustrates a method for processing message-independent and message-dependent components of a signature share.

Preliminaries
Elliptic Curve Groups

An elliptic curve E satisfies the equation:

$$y^2 = x^3 + ax + b \bmod p$$

where $a, b \in \mathbb{Z}_p$ and $a$, $b$ are constants satisfying $4a^3 + 27b^3 \neq 0$. The group over this elliptic curve is defined to be the set of elements $(x, y)$ satisfying this equation along with the point at infinity $_\mathcal{O}$, which is the identity element. The group operation on the elements in this group is called elliptic curve point addition and denoted by $+$. This group is denoted by $E(\mathbb{Z}_p)$ and its order by $n$.

This group operation can be used to define another operation on the elements called point multiplication denoted by $\cdot$. For a point $G \in E(\mathbb{Z}_p)$ and a scalar $k \in \mathbb{Z}_n$, the point $k \cdot G$ is defined to be the point $G$ added to itself $k$ times. In elliptic curve cryptography, a private key is defined to be a scalar $k \in \mathbb{Z}_n \backslash \{0\}$ where $\mathbb{Z}_n \backslash \{0\}$ is notation for the set $\{1, \ldots, n-1\}$, and the corresponding public key is the point $k \cdot G$ on an elliptic curve. For instance, in some blockchain protocols, the elliptic curve is chosen to be the secp256k1 elliptic curve, and the values $a$, $b$, and $p$ are completely specified by this curve. The order $n$ of this group has been calculated given these values, which in the case of this curve is a prime, and the secp256k1 standard also specifies a point G which is to be used as the generator of this group.
Elliptic Curve Digital Signature Algorithm In order to create a signature on a message msg, with the private key a, the following steps are taken:

1. Calculate the message digest $e = \text{hash}(\text{msg})$, where may be any hash function. For instance, in some examples $\text{hash}(\text{msg}) = \text{SHA256}(\text{SHA256}(\text{msg}))$ where $\text{SHA256}(\blacksquare)$ is the SHA-256 hash function. Note that instead the message may be hashed only once, or more that two times with the same or different hash functions.
2. Chose a random integer $k \in \{1, \ldots, n-1\}$, where n is the order of the elliptic curve, e.g. the secp256k1 curve. In the following, k is referred to as the ephemeral private key.
3. Calculate the ephemeral public key corresponding to this ephemeral private key $k \cdot G = (R_x, R_y)$.
4. Calculate $r = R_x \bmod n$. If $r = 0$, return to step 2.
5. Calculate the multiplicative inverse of the ephemeral key $k^{-1} \bmod n$.
6. Calculate $s = k^{-1}(e + ar) \bmod n$. If $s = 0$, return to step 2.
7. The signature on the message msg is $(r, s)$.

The ephemeral key must be kept secret, otherwise the private key can be calculated, given a message and signature. Additionally, each time a signature is generated, a different ephemeral key must be used. If this is not the case, it is possible to derive the private key a given two different signatures and their corresponding messages.

Given a message msg, a public key $P = a \cdot G$, and corresponding signature $(r, s)$, then one can verify the signature by completing the following steps:

1. Calculate the message digest $e = \text{hash}(\text{msg})$, e.g. $e = \text{SHA256}(\text{SHA256}(\text{msg}))$.
2. Calculate the multiplicative inverse $s^{-1}$ of s modulo n.
3. Calculate $j_1 = es^{-1} \bmod n$ and $j_2 = rs^{-1} \bmod n$.
4. Calculate the point $Q = j_1 \cdot G + j_2 \cdot P$.
5. If $Q = _\mathcal{O}$, the point at infinity, the signature is invalid.
6. If $Q \neq _\mathcal{O}$, then let $Q := (Q_x, Q_y)$, and calculate $u = Q_x \bmod n$. If $u = r$, the signature is valid.

In threshold signature schemes, this private key a is split into key shares that are distributed amongst participants in a threshold scheme group.
Joint Verifiable Random Secret Sharing Assume that N participants want to create a joint secret that can only be regenerated by at least $(t+1)$ of the participants in the scheme. To create the shared secret, the following steps are taken:

1. The participants agree on the unique label i for each participant. Each participant i generates $(t+1)$ random numbers $$a_{ij} \in_R \mathbb{Z}_n \backslash \{0\}, \forall j = 0, \ldots, t,$$

where $\in_R$ means a randomly generated element of the set $\mathbb{Z}_n \backslash \{0\}$ where $\mathbb{Z}_n \backslash \{0\}$ is notation for the set $\{1, \ldots, n-1\}$. Then each participant has a secret polynomial of order t $$f_i(x) = a_{i0} + a_{i1}x + \ldots + a_{it}x^t \bmod n,$$

for $i = 1, \ldots, N$. Note that we omit the mod n notation from now on, and it is assumed that all arithmetic operations over integers are done modulo n.

2. Each participant i sends the value $f_i(j)$ to participant j e.g. using a secure communication channel with participant j only.

3. Each participant i calculates their own private secret share of a shared secret polynomial as $$a_i := \sum_{j=1}^{N} f_j(i).$$

A shared secret share is a point with the form $(i, a_i)$, where i is the participants label in the scheme. This method for creating a secret share of a, as described in steps 1-3, is denoted herein by $a_i$=JVRSS(i) for participant i. Note that "JVRSS" typically stands for "Joint verification random secret sharing" and includes steps 4 and 5 as well. However, throughout this document JVRSS is taken to mean performing at least steps 1 to 3, where steps 4 and 5 are optional steps.

Now that the participants have generated a shared polynomial, they can each verify that the other participants have shared the correct information to all participants, and that all participants have the same shared polynomial. This is done in the following way.

4. Each participant i broadcasts to all participants the obfuscated coefficients $$a_{ik} \cdot G,$$

for k=0, . . . , t.

5. Each participant i checks that each participant j has correctly calculated the polynomial point $f_j(i)$ by calculating $f_j(i) \cdot G$ and verifying that $$f_j(i) \cdot G \overset{?}{=} \sum_{k=0}^{t} i^k (a_{jk} \cdot G) \ \forall \ j = 1, \ldots, N.$$

If all participants find that this equation holds for each polynomial, then the group can collectively be sure that they have all created the same shared polynomial.

Reconstructing a Shared Secret

Assume a participant wants to reconstruct a shared secret a which is the zeroth order of a shared polynomial. Given (t+1) points on this polynomial of the form $$(1,a_1), \ldots ,((t+1),a_{t+1}),$$

then to find the shared secret a, one calculates $$\text{interpolate}(a_1, \ldots, a_{t+1}) = \left( \sum_{l=1}^{t+1} a_l \prod_{\substack{1 \le j \le (t+1), \\ j \ne l}} (-j)(l-j)^{-1} \right) = a,$$

which is derived from a general formula known as "Lagrange Interpolation".

Public Key Calculation

Given the N zeroth-order private polynomial coefficient public keys $a_{i0} \cdot G$ for i=1, . . . , N shared in step 4 of JVRSS, each participant calculates the shared public key P using $$P = a \cdot G = \sum_{j=1}^{N} a_{j0} \cdot G,$$

corresponding to the shared secret a.

Addition of Shared Secrets

To calculate the addition of two shared secrets that are shared amongst a group of N participants, where each secret polynomial has order t, without any entity knowing the individual secrets, the following steps are taken:

1. Generate the first shared secret a, where participant i's share is given by $a_i$=JVRSS(i) for i=1, . . . , N with a threshold of (t+1).

2. Generate the second shared secret b, where participant i's share is given by $b_i$=JVRSS(i), with a threshold of (t+1).

3. Each participant i calculates their own additive share $$v_i = a_i + b_i \text{ mod } n.$$

4. All participants broadcast their additive share $v_i$ to all other participants.

5. Each participant interpolates over at least (t+1) of the shares $v_i$ to calculate $$v = \text{interpolate}(v_1, \ldots, v_{t+1}) = a+b.$$

This method for the addition of shared secrets is denoted by ADDSS(i) for participant i, which results in each participant i knowing v=(a+b).

Product of Shared Secrets

To calculate the product of two shared secrets that are both shared amongst a group of N participants, where each secret polynomial has order t, the group takes the following steps:

1. Generate the first shared secret a, where participant i's share is given by $a_i$=JVRSS(i) for i=1, . . . , N. The shared secret polynomial has order t, meaning (t+1) participants are required to recreate it.

2. Generate the second shared secret b, where participant i's share is given by $b_i$=JVRSS(i), and the shared secret polynomial again has order t.

3. Each participant calculates their own multiplicative share $\mu_i$ using $$\mu_i = a_i b_i.$$

4. All participants broadcast their multiplicative share $\mu_i$ to all other participants.

5. Each participant interpolates over at least (2t+1) of the shares $\mu_i$ at 0 to calculate $$\mu = \text{interpolate}(\mu_1, \ldots, \mu_{2t+1}) = ab.$$

This method for calculating the product of two shared secrets is denoted herein by $\mu$=ab=PROSS(i) for participant i.

Inverse of a Shared Secret

In order to calculate the inverse of a shared secret a, the following steps are taken:

1. All participants calculate the product of shared secrets PROSS(i), the result of which is $\mu$=ab mod n.

2. Each participant calculates the modular inverse of $\mu$ which results in $$\mu^{-1} = (ab)^{-1} \text{ mod } n.$$

3. Each participant i calculates their own inverse secret share by calculating $$a_i^{-1} = \mu^{-1} b_i.$$

This method for calculating the inverse of shared secrets is denoted by $a_i^{-1}$=INVSS(i) for participant i.

Shared Private Key Generation and Verification

To calculate a shared private key a between N≥2t+1 participants, t+1 of which are required to create a signature, the participants execute JVRSS with a threshold of t+1 and public key calculation as described above. The result is that every participant i=1, . . . , N has a private key share $a_i$ and the corresponding shared public key P=(a·G).

Ephemeral Key Shares Generation

To generate ephemeral key shares and the corresponding r, as is required in a signature, a group of size N with a shared private key a of threshold (t+1) execute the following steps:

1. Generate the inverse share of a shared secret $k_i^{-1}$=IN-VSS(i), where (t+1) shares are required to recreate it.
2. Each participant calculates $$(x, y) = \sum_{i=1}^{N}(k_{i0} \cdot G),$$

using the obfuscated coefficients shared in the verification of $k_i$, then they calculate $$r = x \bmod n.$$

3. Each participant i stores (r,

Threshold Optimal Signatures

FIG. 1 illustrates an example system 100 for implementing a threshold optimal signature scheme, e.g. a threshold optimal ECDSA scheme. As shown, the system 100 comprises a plurality of parties, including a coordinator 101 and a group of participants 102. Only three participants 102 are shown in FIG. 3, but it will be appreciated that in general the system may comprise any number of participants. Furthermore, in FIG. 1 the coordinator 101 is shown as being distinct from the participants 102, but in some embodiments the coordinator 101 may also be one of the participants 102, e.g. the first participant 102a. Each of the coordinator 101 and participants 102 operates respective computing equipment. Each of the respective computing equipment of the respective parties (i.e. coordinator 101 and participants 102) of the system 100 comprises respective processing apparatus comprising one or more processors, e.g. one or more central processing units (CPUs), accelerator processors (GPUs), application specific processors and/or field programmable gate arrays (FPGAs). The respective computing equipment may also comprise memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive. The respective computing equipment may comprise at least one user terminal, e.g. a desktop or laptop computer, a tablet, a smartphone, or a wearable device such as a smartwatch. Alternatively or additionally, the respective computing equipment may comprise one or more other networked resources, such as cloud computing resources accessed via the user terminal (the cloud computing resources comprising resources of one or more physical server devices implemented at one or more sites). It will be appreciated that any act described as being performed by a party of the system 100 may be performed by the respective computing apparatus operated by that party.

The coordinator 101 is the party that initiates the signature using a threshold number of signature shares generated by respective participants of a group of participants 102. That is, the coordinator 101 generates the signature on a message to be signed. Again, note that generating a signature on a message is taken to mean that a signature is dependent on the message to be signed, or put another way, the signature is a function of the message to be signed. The coordinator 101 may also be the party that sends the signature, and optionally the message, to a third party 103 or otherwise outputs the signature. For instance, the third party 103 may be a certificate authority or other form of authority, or another user. In other examples, the signature may be recorded, e.g. in a database or other document. In some examples, the signature may be made available to the public, e.g. recorded on a website or other publicly accessible medium.

The coordinator 101 may transmit a message to be signed to the participants 102. The message may be transmitted to all of the participants 102, or to a subset of the participants, e.g. the threshold number of participants. In the example of FIG. 1, the group of participants comprises three participants 102a, 102b, 102c. The coordinator 101 may transmit the message to one participant who then forwards the message to one, some or all of the other participants.

The message may be transmitted over the internet using a LAN or WAN connection, or via alternative wired or wireless communication means. The message may be transmitted to each participant 102 individually, e.g. via a secure communication channel between the coordinator 101 and each participant 102, or broadcast to the group as a whole, e.g. via email or other means. The message may be transmitted in raw form, or in encrypted form. For instance, the message may be hashed one or more times.

One or more of the participants 102 may obtain the message via alternative means, i.e. not from the coordinator 101. For example, the message may be generated by one of the participants 102, or otherwise available, e.g. publicly. One or more participants 102 may receive the message from a third party 103. A participant 102 that obtains the message may transmit the message (in raw or encrypted form) to one or more other participants 102. For instance, the first participant 102 may transmit the message to the second participant 102b and/or the third participant 102c.

The coordinator 101 obtains (e.g. receives) a threshold number of signature shares. In the example of FIG. 1, the threshold is two and only the first participant 102a and the second participant 102b decide to generate a respective signature share. For instance, one or more of the participants 102 that generate a signature share may transmit their respective share directly to the coordinator 101, e.g. via a secure communication channel. Alternatively, one or more of the participants 102 may broadcast their respective shares, and/or make their share publicly available. As set out above, the coordinator 101 may also be a participant. In those embodiments, the coordinator 101 may also generate a respective signature share. In that sense, obtaining at least one of the threshold number of signature shares means generating at least one signature share, and therefore the coordinator 101 only need receive one less than the threshold number of signature shares.

In order to obtain the signature shares, the coordinator 101 may transmit a request for signature shares on a message. For instance, the coordinator 101 may transmit a request for signature shares to one, some or all of the group of participants 102.

Having obtained at least the threshold number of signature shares, the coordinator 101 generates the signature using the obtained shares. The coordinator 101 may then broadcast or transmit the signature to one or more other entities. Additionally or alternatively, the coordinator may store the signature, and/or record the signature as part of a digital record, e.g. in an email or other document.

The method for generating a signature share $s_i$ will now be described. The method is described from the perspective of the first participant 102a, but it will be appreciated that each other participant 102 that generates a signature share does so using an equivalent method, albeit using certain data specific to that other participant 102.

Each participant 102 has access to the following data items: a respective private key share $a_i$ (i.e. a share of the same private key), a respective ephemeral private key share $k_i$, and a common shared value r that is generated based on a common ephemeral public key k·G. The common ephemeral public key corresponds to, i.e. is generated based on, the ephemeral private key. Here, a value or key may be common in the sense that each participant has access to that same value or key. Note that unless specified, generating a second key based on a first key does not necessarily imply that the first key itself is known. Examples of how these data items may be generated are provided below.

The first participant 102a obtains, or already has access to, a message to be signed. The message may be in its raw form (e.g. plaintext), or in an encrypted or otherwise encoded for (e.g. ciphertext). The first participant 102a may obtain the message (in either form) from the coordinator and/or from another participant 102. Alternatively, the first participant 102a may generate the message to be signed.

The first participant 102a generates a first signature share $s_1$. Note that "first" in this context is just used as an arbitrary label to distinguish the particular participant and the particular signature share from other participants and signature shares respectively, and does not necessarily imply that the first participant 102a is the first participant to generate a signature share $s_i$, or that the first signature share $s_1$ is the first in an ordered list of signature shares $s_i$.

In some embodiments, the first signature share $s_1$ may be generated based on, i.e. is a function of, a first message-independent component (MIC) (step S401) and a first message-dependent component (MDC) (step S402), where again "first" is just used as a label. The MIC is generated independently of the message. That is to say, the MIC is not a function of the message to be signed (i.e. the MIC is not generated based on the message), and knowledge of the message is not required to generate the MIC. In contrast, the MDC is a function of the message to be signed and knowledge of the message is required to generate the MDC.

In other embodiments, the first signature may not be a function of the first message-independent components (MIC). In these embodiments, the first message-independent component is generated and made available to the coordinator 101, e.g. transmitted to the coordinator 101 or broadcast to one or more participants 102. The first message independent component (MIC) may be shared with the coordinator in advance of, and separately from the first signature share.

The coordinator 101 may obtain a respective message-independent component (MIC) from at least the threshold number of participants, and generate the signature based on the respective signature shares (which are a function of the respective message-dependent components (MDC)) and the respective message-independent components (MIC). (Step S403) More details are provided below.

Since the MIC does not require knowledge of the message, the MIC can be pre-calculated. In other words, the MIC can be generated before obtaining the message. Therefore a plurality of different MICs can be pre-calculated, each for use in generating a different respective signature shares $s_1'$ for signing different messages, where the prime (') indicates that it is a different instance of the first signature share.

Having generated the first signature share s, the first participant 102a makes the first signature share $s_1$ available to the coordinator 101 for generating the signature s on the message. If the first participant 102a is the coordinator 101, making the first signature share $s_1$ available to the coordinator 101 may merely mean outputting the first signature share $s_1$ to a function for generating the signature s. Otherwise, the first participant 102a may transmit the first signature share $s_1$ to the coordinator 101, or to one or more other participants 102 for forwarding to the coordinator 101, or broadcast the first signature share $s_1$, or use a combination of these options. (Step S404)

As stated above, the first signature share $s_1$ may be generated based on a first MIC and a first MDC. Regardless of whether the first signature share is a function of the first MIC, the first MIC is generated based on (i.e. is a function of) the first private key share $a_1$ (i.e. the share of the private key a known to the first participant 102a). The first MIC may also be based on the first ephemeral private key share $k_1$ (i.e. the share of the ephemeral private key k known to the first participant 102a) and the shared value r generated based on the ephemeral public key k·G corresponding to the ephemeral private key k. The first MDC is generated based on (i.e. is a function of) the message (in raw or encrypted form) and may also be generated based on the first ephemeral private key share $k_1$. Variations of the MIC and MDC are provided below.

Preferably, the first private key share $a_1$ may be calculated using a joint secret sharing scheme, e.g. using the JVRSS technique described above. For instance, the first participant 102a may have an index of 1, and generate the first private key share using $a_1=JVRSS(1)$ for participant 1, where the private key is denoted by a. Each participant may generate a respective private key share $a_i$. For instance, the second participant 102b may generate a second private key share using $a_2=JVRSS(2)$ for participant 2, and so on.

Generating a first private key share $a_1$ using a joint secret share scheme may comprise generating a set of numbers $a_{1j} \in_R \mathbb{Z}_n \setminus \{0\}$, $\forall j=0, \ldots, t$, and then generating a first polynomial $f_1(x)=a_{10}+a_{11}x+ \ldots +a_{1t}x^t \mod n$, where the set of numbers are the coefficients of the polynomial. Each of the other participants 102 generates a respective polynomial using a respective set of numbers. For instance, the second participant 102b generates a second polynomial $f_2(x)=a_{20}+a_{21}x+ \ldots +a_{2t}x^t \mod n$. The participants 102 then transmit, to each other participant, a value of their respective function evaluated at the index of that other participant. For instance, the first participant 102a evaluates $f_1(2)$ for the second participant 102b and then transmits that value to the second participant 102b, evaluates $f_1(3)$ for the third participant 102c and then transmits that value to the third participant 102c, and so on. The first participant 102a obtains the respective values generated, as a function of the first participant's index, by the other participants 102. The values may be transmitted over the internet, or via other means. The values may be transmitted via respective secure communication channels between respective pairs of the participants. Instead of transmitting directly, one or more participants 102 (e.g. the first participant 102a) may broadcast their respective values. Having obtained at least the threshold number of values from at least the threshold number of participants, the first participant 102a generates the first private key share based on the first value and each other obtained data value, e.g. $f_2(1)$, $f_3(1)$, etc.

The first participant may calculate the corresponding public key a·G based on a set of obfuscated coefficients, where the coefficients are used to generate the respective private key shares $a_i$ of each participant 102. That is, when generating the ephemeral private key share $k_i$, each participant 102 may share the obfuscated coefficients $a_{ij}·G$ with each other participant 102. The coefficients are obfuscated by a common generator point G on the chosen elliptic curve. These obfuscated coefficients may be transmitted between participants 102 directly, or broadcast to the group. For instance, the first participant 102a may broadcast the obfuscated coefficients $a_{10}·G$, $a_{11}·G$, $a_{12}·G$, and so on. The public key corresponding to the private key may then be calculated as $$P = a·G = \sum_{j=1}^{N}(a_{j0}·G).$$

Note that the private key shares $a_i$ may be generated using an alternative method, i.e. not using the JVRSS method described above. Whilst each participant requires a share of a private key a in order to generate a respective signature share $s_i$, the particular method for generating the private key share may be chosen to suit the particular scenario, e.g. whether some, all or none of the participants can be trusted, or whether a trusted dearer is available to distribute key shares, etc. Methods for generating shares of a private key are, in themselves, known in the art. Similarly, method for distributing shares of a private key (or other such data) are, in themselves, known in the art. That being said, the private key share $a_i$ may be generated in a number of ways. For instance, a dealer (e.g. the coordinator) may be used to generate and distribute one, some or all of the private key shares $a_i$, e.g. using a Shamir's secret sharing scheme. One such scheme that may be used for generating and distributing private key shares $a_i$ is described in WO2017145010A1.

Similarly, an alternative to JVRSS may be used when generating some or all of the private key shares described below, e.g. the ephemeral private key share $k_i$, the first blinding value key share $α_i$ and/or the second blinding value key share $β_i$.

The first ephemeral private key share $k_1$ may be calculated using a joint secret sharing scheme, e.g. using the JVRSS technique described above. For instance, the first participant 102a may have an index of 1, and generate the first ephemeral private key share using $k_1=JVRSS(1)$ for participant 1, where the ephemeral private key is denoted by k. Each participant 102 may generate a respective ephemeral private key share $k_i$. For instance, the second participant 102b may generate a second ephemeral private key share using $k_2=JVRSS(2)$ for participant 2, and so on.

Generating the first ephemeral private key $k_1$ share using the joint secret sharing scheme comprises the same steps described above for generating the first private key share $a_1$, except that the random numbers used for generating the ephemeral private key share $k_1$ are different numbers comparted to those used for generating the private key share $a_1$.

Note that the same private key a, and private key shares $a_i$ are used for each signature, whereas the ephemeral private key k and ephemeral private key shares $k_i$ are changed for each signature.

The shared value r is generated based on the ephemeral public key k·G corresponding to the ephemeral private key k. The ephemeral public key (x, y) comprises two components, usually referred to as the x and y components. The shared value r may be a function of the x component of the ephemeral public key, e.g. r=x mod n.

The ephemeral public key k·G may be generated based a set of obfuscated coefficients, wherein the coefficients were used to generate the respective ephemeral private key shares $k_i$ of each participant 102. That is, when generating the ephemeral private key share $k_i$, each participant 102 shares the obfuscated coefficients $k_{ij}·G$ with each other participant 102. The coefficients are obfuscated by a common generator point G on the chosen elliptic curve. These obfuscated coefficients may be transmitted between participants 102 directly, or broadcast to the group. For instance, the first participant 102a may broadcast the obfuscated coefficients $k_{10}·G$, $k_{11}·G$, $k_{12}·G$, and so on. The ephemeral public key may then be calculated as $$(x, y) = \sum_{i=1}^{N}(k_{i0}·G).$$

In some embodiments, the first MIC is generated based on a first inverse share $k_i^{-1}$ corresponding to the first ephemeral private key share $k_1$. That is, the first inverse share $k_i^{-1}$ is a function of the first ephemeral private key share $k_1$.

The first inverse share $k_i^{-1}$ may be an inverse of shared secrets, for example, generated by calculating $k_i^{-1}=INVSS(1)$ for participant 1. As set out above, calculating the inverse of shared secrets comprises calculating the product of shared secrets. The first participant 102a generates an intermediate value $μ$ as the product of the first ephemeral private key k and a first blinding key $α$. For instance, the intermediate value may be calculated as by $μ=kα=PROSS(1)$ for participant 1, the result of which is $μ=kα$ mod n.

This may involve each participant 102 generating a multiplicative share $μ_i=k_iα_i$, where $α_i$ is a share of the first blinding key $α$. Each participant 102 may calculate their respective share $α_i$ of the first blinding key $α$ using a joint secret sharing scheme, e.g. using the JVRSS technique described above. For instance, the first participant 102a may have an index of 1, and generate a share of the first blinding key using $α_1=JVRSS(1)$ for participant 1. Each participant shares (e.g. via direct transmission or broadcasting) their respective multiplicate share $μ_i$, and then generate the intermediate value $μ$ based on each of the multiplicative shares $μ_i$, e.g. by interpolation. The first inverse share $k_i^{-1}$ may be generated by calculating the inverse of the intermediate value $μ$. For instance, the first participant 102a may calculate the modular inverse of $μ$ which results in $$μ^{-1}=(kα)^{-1} \text{ mod } n.$$

The first participant 102a may then calculate the first inverse share $k_1^{-1}$ based on the modular inverse $μ^{-1}$ of the intermediate value and their respective first blinding key share $α_1$, e.g. by calculating $$k_1^{-1}=μ^{-1}α_1.$$

Note that the use of the blinding key share $α_i$ is optional and may be omitted from the above steps.

Optionally, the MIC may be generated based on (i.e. a function of) a share of a second blinding key $β$. That is to say, the MIC is also based on the first share $β_1$ of the second blinding key $β$, in addition to the previously mentioned data items. The first share of the second blinding key may be calculated using a joint secret sharing scheme, e.g. using the JVRSS technique described above. For instance, the first participant 102a may have an index of 1, and generate the first share of the second blinding key using $β_1=JVRSS(1)$ for participant 1, where the second blinding key is denoted by $β$.

The MIC may be generated based on a first pre-signature share $\sigma_1$ which is a function of a first intermediary share $\lambda_1$ and a respective intermediary share $\lambda_i$ obtained from at least the threshold number of participants 102. That is, each of the participants 102 may generate a respective intermediate share $\lambda_i$ and transmit and/or broadcast those intermediate shares $\lambda_i$ to the other participants 102. The first participant 102a may collect the intermediary shares $\lambda_i$ to generate a common intermediary value $\lambda$, e.g. by interpolation of the intermediary shares $\lambda_i$. The first participant 102a, (and optionally, the other participants 102) may generate a plurality of pre-signature shares $\sigma_1'$, each for use in the generation of different signature shares $s_1'$.

The first intermediary share $\lambda_1$ may be a function of the first private key share $a_1$ and the first inverse share $k_1^{-1}$. In that case, each of at least the threshold number of participants 102 generates and shares a respective intermediary share $\lambda_i$ that is a function of their respective private key $a_i$ share and their respective inverse share $k_i^{-1}$.

Alternatively, the first intermediary share $\lambda_1$ may be a function of the first private key share $a_1$ and the first share of the first blinding key $\alpha_1$. In that case, each of at least the threshold number of participants 102 generates and shares a respective intermediary share $\lambda_i$ that is a function of their respective private key share $a_i$ and their respective share of the first blinding key $\alpha_1$.

In some embodiments, the first pre-signature share $\sigma_1$ may also be generated based on the first share of the second blinding key $\beta_1$. For instance, the first intermediary share $\lambda_1$ may be a function of the first share of the second blinding key $\beta_1$. In additional or alternative embodiments, the first intermediary share $\lambda_1$ may also be a function of the common value r.

FIG. 2 illustrates an example method 200 for generating a signature on a message according to embodiments of the invention. Steps S201 to S208 are performed by each of a threshold number of participants 102 in this example (including the first participant 102a). Step S209 is performed by a coordinator 101, who may also may one of the participants performing steps S201 to S208. It will be appreciated that some of the steps may be omitted or be performed in a different order.

The example method 200 enables the creation of a shared secret of threshold (t+1) in a group of $N \geq 2t+1$ participants, where the signing threshold is also (t+1).

Set-Up:

In step S201, each participant 102 calculates a shared private key share and a corresponding public key. For instance, each participant 102 may calculate the shared private key, and corresponding public key using JVRSS and the calculation of the public key given in the preliminaries. At this point, each participant i has a secret key share and public key $(a_i, P)$, where P is notation for the public key corresponding to the shared private key. The shared private key has a threshold of (t+1).

Pre-Calculation:

In step S202, each participant 102 calculates a shared ephemeral key share and a corresponding public key. For instance, each participant 102 may calculate a shared ephemeral key using JVRSS and the calculation of the public key given in the preliminaries. Each participant 102 may then calculate an inverse share based on the ephemeral private key. This results in each participant having an inverse share $(k_i^{-1}, r)$, with a threshold of (t+1).

In step S203, each participant 102 creates two different shared blinding key shares. For instance, each participant 102 may create two shared secrets so that participant i has shares $\alpha_i$=JVRSS(i) and $\beta_i$=JVRSS(i), each shared secret having a threshold (t+1). Note that in some examples, not all of the shared secrets need to have the same threshold.

In step S204, each participant 102 calculates an intermediary share and broadcasts their intermediary share to the other participants. For instance, each participant i may calculate the intermediary share $\lambda_i = k_i^{-1} a_i + \beta_i$. This value has a threshold of (2t+1).

In step S205, each participant 102 calculates an intermediary value based on at least the intermediary shares. For instance, each participant 102 may calculate the intermediary value using interpolation over (2t+1) shares $\lambda$=interpolate($\lambda_1, \ldots, \lambda_{2t-1}$)=$k^{-1}\alpha+\beta$.

In step S206, each participant 102 calculates a pre-signature share. For instance, each participant i may calculate their pre-signature share $\sigma_i = \lambda - \beta_i = (k^{-1}\alpha + \beta) - \beta_i$. Each participant 102 may store $(r, k_i^{-1}, \sigma_i)$, and the private key share and corresponding public key $(a_i, P)$.

Note that since a different ephemeral key is used for each signature, multiple ephemeral keys can be set up at one time, that is, steps S202 to S206 can be repeated to create multiple ephemeral keys during pre-calculation and stored for later use. These can be executed at the same time so that there are no additional rounds of communication. Note that preferably, a different value of $\alpha$ and $\beta$ should be used for each signature.

Signature Generation:

In order to sign a message msg, at least (t+1) participants must perform steps S207 and S208.

In step S207, at least the threshold number of participants 102 obtain a message to be signed and calculate a message digest. For instance, a coordinator 101 may send a request to (t+1) participants to create a signature share on the message msg. Each participant i may calculate the message digest e=hash(msg). In some examples, this hash function is the double SHA-256 hash function. Alternative hash functions may be used.

In step S208, at least the threshold number of participants 102 calculate a signature share and send it to the coordinator 101. For instance, each participant i may calculate their signature share $s_i = k_i^{-1}e + r\sigma_i$, and then send their signature share $(r, s_i)$ to the coordinator. Note that the value r may not be sent by all participants.

In step S209, the coordinator 101 calculates the signature. For instance, the coordinator 101 may calculate s=interpolate($s_1, \ldots, s_{t+1}$)=$k^{-1}(e+ar)$, and finally the signature (r, s).

There are several alternatives for pre-calculating the message independent component of the signature share. These can broadly be split into two sets of variations: when to include r in the calculation, and when to include $(k\alpha)^{-1}$. These can be selected independent of each other and so there are eight variations to the above method 200.

One modification is to store $(r, k_i^{-1}, r\sigma_i)$ during step S206, meaning that r is included in the pre-signature share.

Another modification is that the multiplication with r can also come earlier during the calculation of the intermediary shares. By defining instead $\lambda_i = rk_i^{-1}\alpha_i + \beta_i$ in step S204, then in step S206, $\sigma_i = \lambda - \beta_i = (rk^{-1}\alpha + \beta) - \beta_i$ and the calculation of signature shares is $s_i = k_i^{-1}e + \sigma_i$.

Another modification is to instead calculate $\lambda_i = \alpha_i a_i + \beta_i$ such that $\lambda = (k\alpha)^{-1}(\alpha a + \beta)$, and $\sigma_i = \lambda - (k\alpha)^{-1}\beta_i$. The two variations of including r at alternative points can be done in combination with this. Each participant has knowledge of $k\alpha$ as it is calculated in step S202 of the pre-calculation. Additionally, all participants 102 broadcast their $\lambda_i$ share. So each participant 102 has knowledge of (at least) 2t+1 shares and the value $k\alpha$. They can then calculate $$\lambda=(k\alpha)^{-1}\times\text{interpolate}(\lambda_1,\ldots,\lambda_{2t+t})$$

Another modification is to instead calculate the intermediary value as $\lambda=(\alpha a+\beta)$ and the pre-signature share as $\sigma_i=\lambda-\beta_i$. Finally, the signature share would then be $s_i=k_i^{-1}e+r(k\alpha)^{-1}\sigma_i$. The two variations of when to include r in the calculation can also be done in combination with this. Each participant 102 has knowledge of $k\alpha$ from the calculation of $k_i^{-1}$. They can then calculate $(k\alpha)^{-1}$ mod n with this, and then include it in the calculation of $s_i$.

In summary, each participant 102 may generate four secret shares: $a_i$, $k_i$, $\alpha_i$, $\beta_i$. Two products need to be calculated in the example method 200: $k\alpha$ which is then used to calculate $(k\alpha)^{-1}\alpha_i=k_i^{-1}$ (interpolation over these shares gives $k^{-1}$ as the $\alpha$'s will cancel), and $k^{-1}a$ for use in the signature, which uses the first product, and so if the shares are expanded, the calculated gives $k_i^{-1}a_i=(k\alpha)^{-1}\alpha_ia_1$. Any calculations with the $k_i^{-1}$ share, which is made of $k\alpha$ and $\alpha_i$, can be done by doing the calculation just with $\alpha_i$ itself first, and then multiplying by $(k\alpha)^{-1}$ where necessary.

One version of the above scheme can be summarised by saying that a signature is calculated using shares that are composed of a message independent component (MIC) and a message dependent component (MDC), where the MIC may be based on the pre-signature share $\sigma_i$ and the MDC is based on the message e.

An equivalent scheme comprises calculating the MIC as above, and then incorporating this in the signature along with the signature shares, e.g. after interpolation of the signature shares which are made of just an MDC. Explicitly, the scheme may be same up to step S206 of the pre-calculation, where the intermediary shares include the r value, $\lambda_i=k_i^{-1}a_ir+\beta_i$, such that after interpolation this is $\lambda=k^{-1}ar+\beta$.

At this stage, the participants have knowledge of (r, $k_i^{-1}$, $\lambda$, $\beta_i$) and store this along with the private key share and corresponding public key ($a_i$, P), Then in order to generate their signature share on a given message m which is hashed to create the message digest e=hash(m), the participants calculate $$s_i=k_i^{-1}e-\beta_i,$$

and send this to a coordinator. The coordinator then calculates $$s=\text{interpolate}(s_1,\ldots,s_{t+1})+\lambda,$$

$$=k^{-1}e+k^{-1}ar,$$

resulting in the expected signature share since the $\beta$ terms cancel. Similar variations of this protocol can be made as above describing when the $(k\alpha)^{-1}$ and r is included in the calculation.

The following variations for calculating the message-independent component may be implemented:

i) Calculate:

$$\lambda=k^{-1}a+\beta$$

Then the signature shares are now:

$$s_i=k_i^{-1}e-r\beta_i$$

And the signature is generated as:

$$s=\text{int}(s_1,\ldots,s_{t+1})+r\lambda$$

ii) Calculate:

$$\lambda=\alpha ar+\beta$$

Then the signature shares are now:

$$s_i=\alpha_ie-\beta_i$$

And the signature is generated as:

$$s=(k\alpha)^{-1}(\text{int}(s_1,\ldots,s_{t+1})+\lambda)$$

iii) Calculate:

$$\lambda=\alpha a+\beta$$

Then the signature shares are now:

$$s_i=k_i^{-1}e-r\beta_i$$

And the signature is generated as:

$$s=(k\alpha)^{-1}(\text{int}(s_1,\ldots,s_{t+1})+r\lambda)$$

iv) Calculate:

$$\lambda=\alpha ar+\beta$$

Then the signature shares are now:

$$s_i=k_i^{-1}e-(k\alpha)^{-1}\beta_i$$

And the signature is generated as:

$$s=(\text{int}(s_1,\ldots,s_{t+1})+(k\alpha)^{-1}\lambda)$$

v) Calculate:

$$\lambda=\alpha a+\beta$$

Then the signature shares are now:

$$s_i=k_i^{-1}e-r(k\alpha)^{-1}\beta_i$$

And the signature is generated as:

$$s=(\text{int}(s_1,\ldots,s_{t+1})+r(k\alpha)^{-1}\lambda)$$

One difference between the method 200 and the previous schemes is that the calculation of the $k^{-1}a$ term in the signature may be moved into the pre-calculation phase. The result of this is that the signature generation has the same threshold as the private key calculation and so is now a threshold-optimal scheme. To see how the correct signature is found, it is noted that the interpolation over the signature shares results in $$s = k^{-1}e + r(k^{-1}a + \beta - \beta)$$
$$= k^{-1}e + r(k^{-1}a)$$
$$= k^{-1}(e + ar),$$

which is exactly the signature as required.

Note that the thresholds of the secrets may be different. That is the threshold of a, k, $\alpha$, $\beta$ themselves do not necessarily need to be the same to execute the signature generation scheme. For example, if there is a group of six and three are needed to create the signature and/or private key, they could technically do the calculation with the threshold of the k being four and the thresholds of the other shared secrets being three, and they will still have a threshold-optimal scheme.

Note that if the blinding secret $\beta$ is not used, then it may be possible to calculate the ephemeral key and therefore the shared secret key in the following way. Assume that the participants use simply ($k^{-1}a$), and that they also know r, e, and s. Anyone in the scheme can calculate $$(s-(k^{-1}a)r)e^{-1}=k^{-1}.$$

This result can then be used to calculate $$(k^{-1})^{-1}(k^{-1}a)=a,$$ which is the shared private key.

By including $\beta$ in the calculation, this calculation cannot be done. The value $(k^{-1}a+\beta)$ gives away no information about the individual secrets, nor the result $k^{-1}a$. In order to gain any information that would reveal the private key a, at least $(t+1)$ participants must collaborate which is the same number as the threshold of the private key, and so the security is not decreased by calculating this intermediate value $\lambda$.

A problem to solve with previous threshold optimal signature calculations is that one must calculate the product of two shared secrets, where the secrets are sums of individual secrets of all participants in a group $$a = \sum_{i=1}^{N} a_{i0}, \ k = \sum_{i=1}^{M} k_{i0}.$$

In a signature, if the private key a is a shared secret then necessarily k must be as well (or else a can be calculated by anyone who knows k). The second term in the signature is then the multiplication of two shared secrets and this is the part that makes it difficult to achieve optimality. In the non-optimal scheme by Gennaro et al. and the example method 200 described above, these secrets are each the zeroth order of a polynomial of order-t, and multiplying the polynomials together results in a threshold of 2t+1 shares required to calculated the result of the multiplication. To ensure honesty in this scheme, most communications can be broadcast, and simple equivalences can be checked. Additionally, if a participant drops out of the calculation of a signature, it is easy for another participant to contribute.

In the threshold-optimal scheme by Gennaro et al., this threshold of 2t+1 is avoided by calculating the individual terms in the product of the secrets individually. That is, each pair of participants i,j calculate the individual terms $a_{i0}k_{j0}$ for each i,j and summing these results. The ephemeral key k is created during signing, and then these products of individual secret contributions are calculated using Pallier encryption. This requires that each participant must communicate individually with all other signers. To ensure honesty in this case, there are multiple zero-knowledge proofs that must be executed. In this case, if a participant drops out of the calculation of the signature, the signature algorithm must be restarted.

In other words, each secret is the sum of individual secrets and the multiplication of two secrets is a multiplication of two sums of individual terms, which can be expanded out as $$a_{10}b_{10}+a_{20}b_{10}+ \ldots b_{n0}a_{n0}, \text{ etc}$$

The Gennaro scheme calculates these terms individually. That is, participant 1 has to calculate $a_{20}b_{10}$ with participant 2, and also $a_{30}b_{10}$ with participant 3 and so on. These are then all summed together. These individual calculations involve computationally expensive zero knowledge proofs. So as soon as there are many people in the scheme it becomes inefficient. This is also all done at the signing phase, and so it is a computationally expensive way to calculate a signature.

In a simple case with 3 participants, the rounds of communication are roughly comparable between the two schemes (i.e. the optimal threshold scheme by Gennaro et al. and the example method 200): while the Gennaro scheme does have more, this is not where the main efficiency savings are. The savings are in the volume of data that is calculated and communicated. Gennaro's scheme has to include multiple zero-knowledge proofs (ZKPs) which are not present in the example method 200.

The following compares a 2-of-3 scheme implemented using the optimal threshold scheme by Gennaro et al. and the example method 200. In Gennaro's scheme there is a JVRSS before signing and an additional encryption key to create for Pallier's encryption. Then there are seven ZKPs to create, and seven ZKPs to verify in the signature calculation. These ZKPs cannot be sent simultaneously, so there are multiple rounds of communication in the signing phase. Additionally, in some steps, each participant must communicate individually with all other participants in the signing phase, which is inefficient. This means that those participants must all be online at the same time. In contrast, the present invention enables a given participant to calculate a signature share without the other participants being online.

On the other hand, in the present scheme described above, there are four JVRSS calculations in the pre-signing phase and no ZKPs at any point. The JVRSS calculation can be done simultaneously and so the communication is the same as one JVRSS. In the signing phase, there is only a request-response style communication, and all information can be broadcast to the group.

To compare between the storage of the two schemes, note that the ephemeral key is calculated with the set-up stage in the scheme above. This means that there is more storage required when compared to Gennaro's scheme. For the scheme described above, there are three additional values to be stored corresponding to creating a signature, each with e.g. 32 bytes of storage space required. This is minimal considering the efficiency savings in the calculation and communication, and the optimality achievement.

To summarise, Gennaro's scheme reduces the storage required after set-up and pre-calculation but increases the calculation and communication during the signature calculation. This is due to it being inefficient to move any more of the calculation to pre-signing in Gennaro's scheme. The scheme of the present invention is more efficient than Gennaro's optimal scheme, particularly if the inequality N 2t+1 is acceptable.

Example Use Case

In general, the present invention can be used to generate a signature on any message. As a particular example use case, the message may be part or all of a blockchain transaction. That is, the signature may be used to sign one or more inputs and/or one or more outputs of a blockchain transaction.

FIG. 3 illustrates an example transaction protocol for use as part of a blockchain protocol. Example blockchain protocols are well documented in the literature, but a description of an example protocol transaction is provided here for completeness. This is an example of a UTXO-based protocol. A transaction 152 (abbreviated "Tx") is the fundamental data structure of the blockchain (each block of the blockchain comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital token, e.g. representing an amount of a digital asset. This represents a set number of tokens on the (distributed) ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners.

Say a first user, e.g. Alice, wishes to create a transaction 152j transferring an amount of the digital token in question to a second user, e.g. Bob. In FIG. 3 Alice's new transaction 152j is labelled "Tx$_1$". It takes an amount of the digital token that is locked to Alice in the output 203 of a preceding transaction 152i in the sequence, and transfers at least some of this to Bob. The preceding transaction 152i is labelled "Tx$_0$" in FIG. 3. Tx$_0$ and Tx$_1$ are just arbitrary labels. They do not necessarily mean that Tx$_0$ is the first transaction in the blockchain, nor that Tx$_1$ is the immediate next transaction in the pool. Tx$_1$ could point back to any preceding (i.e. antecedent) transaction that still has an unspent output 203 locked to Alice.

The preceding transaction Tx$_0$ may already have been validated and included in the blockchain at the time when Alice creates her new transaction Tx$_1$, or at least by the time she sends it to the network 106. It may already have been included in one of the blocks at that time, or it may be still waiting in the pool 154 in which case it will soon be included in a new block. Alternatively Tx$_0$ and Tx$_1$ could be created and sent to the blockchain network together, or Tx$_0$ could even be sent after Tx$_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network, or arrive at any given node. Nevertheless, a subsequent transaction (the descendent transaction or "child") which points to a preceding transaction (the antecedent transaction or "parent") will not be validated until and unless the parent transaction is validated. A child that arrives at a node before its parent is considered an orphan. It may be discarded or buffered for a certain time to wait for the parent, depending on the node protocol and/or miner behaviour.

One of the one or more outputs 203 of the preceding transaction Tx$_0$ comprises a particular UTXO, labelled here UTXO$_0$. Each UTXO comprises a value specifying an amount of the digital token represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, UTXO$_0$ in the output 203 of Tx$_0$ comprises a locking script [Checksig P$_A$] which requires a signature Sig P$_A$ of Alice in order for UTXO$_0$ to be redeemed (strictly, in order for a subsequent transaction attempting to redeem UTXO$_0$ to be valid). [Checksig P$_A$] contains the public key P$_A$ from a public-private key pair of Alice. The input 202 of Tx$_1$ comprises a pointer pointing back to Tx$_1$ (e.g. by means of its transaction ID, TxID$_0$, which in embodiments is the hash of the whole transaction Tx$_0$). The input 202 of Tx$_1$ comprises an index identifying UTXO$_0$ within Tx$_0$, to identify it amongst any other possible outputs of Tx$_0$. The input 202 of Tx$_1$ further comprises an unlocking script <Sig P$_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction Tx$_1$ arrives at a node, the node applies the node protocol. This comprises running the locking script and unlocking script together to check whether the unlocking script meets the condition defined in the locking script (where this condition may comprise one or more criteria). In embodiments this involves concatenating the two scripts:

$$<\text{Sig } P_A><P_A>\|[\text{Checksig } P_A]$$

where "||" represents a concatenation and "< . . . >" means place the data on the stack, and "[ . . . ]" is a function comprised by the unlocking script (in this example a stack-based language). Equivalently the scripts may be run one after the other, with a common stack, rather than concatenating the scripts. Either way, when run together, the scripts use the public key P$_A$ of Alice, as included in the locking script in the output of Tx$_0$, to authenticate that the locking script in the input of Tx$_1$ contains the signature of Alice signing the expected portion of data. The expected portion of data itself (the "message") also needs to be included in Tx$_0$ in order to perform this authentication. In embodiments the signed data comprises the whole of Tx$_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node of the blockchain network is able to authenticate that the encrypted version of the message must have been signed by Alice. Signing typically comprises hashing the message, signing the hash, and tagging this onto the clear version of the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node deems $Tx_1$ valid. If it is a mining node, this means it will add it to the pool of transactions awaiting proof-of-work. If it is a forwarding node, it will forward the transaction $Tx_1$ to one or more other nodes in the blockchain network, so that it will be propagated throughout the network. Once $Tx_1$ has been validated and included in the blockchain, this defines $UTXO_0$ from $Tx_0$ as spent. Note that $Tx_1$ can only be valid if it spends an unspent transaction output 203. If it attempts to spend an output that has already been spent by another transaction, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions. In practice a given node 104 may maintain a separate database marking which UTXOs 203 in which transactions have been spent, but ultimately what defines whether a UTXO has been spent is whether it has already formed a valid input to another valid transaction in the blockchain.

If the total amount specified in all the outputs 203 of a given transaction is greater than the total amount pointed to by all its inputs 202, this is another basis for invalidity in most transaction models. Therefore such transactions will not be propagated nor mined into blocks.

Note that the script code is often represented schematically (i.e. not the exact language). For example, one may write [Checksig $P_A$] to mean [Checksig $P_A$]=OP_DUP OP_HASH160 <H($P_A$)> OP_EQUALVERIFY OP_CHECKSIG. "OP_ . . . " refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain that the condition for a UTXO to be redeemed comprises authenticating a signature. More generally the scripting language could be used to define any one or more conditions. Hence the more general terms "locking script" and "unlocking script" may be preferred.

According to some embodiments of the present invention, the signature generated by the coordinator 101 may be used to sign a blockchain transaction. For instance, the generated signature may be used, at least in part, to unlock an output of a blockchain transaction. As a particular example, the output of a previous transaction may be a pay-to-public-key-hash (P2PKH) output which is locked to a hash of a public key. In order to be unlocked, an input of a later transaction that references the P2PKH output needs to include the (unhashed) public key and a signature generated based on the private key corresponding to the public key.

Represented in script, the "locking script" and "unlocking script" may take the following forms:
Locking script=OP_DUP OP_HASH160<Public KeyHash>OP_EQUAL OP_CHECKSIG Unlocking script=<Signature><Public Key>

Referring to the above described embodiments, the <Public Key> may be equated to P=a·G, and the <Signature> comprises the threshold signature s, where the previous transaction is the message to be signed. Note that as stated above, ECDSA signatures are in the form (r, s).

Note that the described signature generation method is not limited to any particular use case and may in general be used for generating a signature based on any message. Signing all or part of a blockchain transaction is just one illustrative example. The described method may be used to sign and/or authorise, for instance, a legal document (e.g. a will, deed or other contract), correspondence between one or more parties, digital certificates (e.g. issued by a certificate authority), medical prescriptions, a bank transfer or a financial instrument, a mortgage or loan applications, etc.

As a particular example, the group of participants (say five participants in total) may form the Board of a company. Voting matters of the company may require a majority of the Board (i.e. at least three participants) to agree on the particular vote. The Board may use the described signature generation method to prove that at least three Board members agreed to vote in favour of a particular outcome. In this example, the threshold of the signature generation scheme is three. That is, at least three of the Board members must provide a respective signature share in order for the co-ordinator to successfully generate a signature. If a signature is generated successfully, at least the threshold number (i.e. three) of Board members must have agreed to vote in favour of that outcome. Thus the successful generation of a signature acts as a record of the vote and proves that a majority of the Board voted in a particular way.

Another use case for the present invention lays in the field of digital certificates, e.g. digital certificate issued by the X.509 standard. A digital certificate contains a signature that signs over some data. The data can in general be any data, but one particular example of data included in a digital certificate is a public key. A public key in a digital certificate is often referred to as a "certified public key". The issuer of the digital certificate (a "certificate authority") may perform one or more checks on the owner of the public key (e.g. know-your-customer checks), and if the checks are successful, the certificate authority issues a digital certificate that includes the certified public key. A user can use a certified public key to prove they are who they say they are, e.g. by signing a message with a private key corresponding to the certified public key.

One particular use for certificate authorities is to sign certificates used in HTTPS for secure browsing on the internet. Another common use is in issuing identity cards by national governments for use in electronically signing documents. The certificate authority signs the public key (or any other data to be attested to) using a private key. This introduces a single point of failure. That is, if a malicious party can gain access to the private key used by the certificate authority to issue digital certificates, the malicious party can then issue fraudulent certificates. A particular example of a certificate authority being targeted is DigiNotar, a Dutch certificate authority. The private key used by DigiNotar was compromised in 2011 and used to issue fraudulent certificates. This attack was possible as the attacker needed only to obtain a single piece of data, i.e. the private key. However, this attack would not have been possible (or at least made more difficult) if the certificate authority (DigiNotar) used a threshold signature scheme according to the present invention. In order to issue certificates, an attacker must acquire the threshold number of key shares (or signature shares) required for generating the signature.

It will be appreciated that the above embodiments have been described by way of example only. More generally there may be provided a method, apparatus or program in accordance with any one or more of the following Statements.

Statement 1. A computer-implemented method of generating a share of a digital signature of a message, wherein a threshold number of different signature shares from respective participants of a group of participants are required to generate the digital signature, wherein each participant has a respective private key share, the method being performed by a first one of the participants and comprising:
generating a first message-independent component and a first message-dependent component, wherein the message-independent component is generated based on a first private key share and wherein the message-dependent component is generated based on the message;
causing the first message-independent component to be made available to a coordinator; and
causing a first signature share to be made available to the coordinator for generating the signature based on at least the threshold number of signature shares, wherein the first signature share comprises at least the message-dependent component.

For instance, the first message-independent component may be sent to the coordinator before the first signature share, and even before the first message-dependent component is generated.

Statement 2. The method of statement 1, wherein the message-independent component is generated prior to obtaining the message.

In other words, the message-independent component may be pre-calculated. That is, the message-independent component can be generated in advance of obtaining (e.g. receiving) the message. Then, once the message has been obtained, the message-dependent component can be generated, thus enabling the signature share to be generated.

Statement 3. The method of statement 1 or statement 2, wherein the first signature share comprises the message-independent component.

That is, in at least some embodiments the first signature share does not contain the message-independent component.

Statement 4. The method of any of statements 1 to statement 3, wherein the first private key share is generated using a joint secret sharing scheme for generating a share of a first private key.

Statement 5. The method of statement 4, wherein generating the first private key share using the joint secret sharing scheme comprises:
generating a first data item, the first data item being a first polynomial;
obtaining a respective data item from at least the threshold number of participants, each respective data item being a respective polynomial generated by a respective participant; and
generating the first private key share based on the first data item and each of the respective data items.

Statement 6. The method of statement 5, wherein obtaining the respective data items comprises obtaining the respective data items over a respective communication channel between the first participant and each of the respective participants.

Preferably, each communication channel is a secure communication channel.

Statement 7. The method of statement 4 or statement 5, comprising transmitting a respective instance of the first polynomial to at least each of the threshold number of participants, wherein the respective instance of the first polynomial is based on a respective participant.

E.g. the respective instances may be transmitted over the respective communication channel.

In some examples, the joint secret sharing scheme may be a joint verifiable secret sharing scheme that further comprises:
sharing, with at least each of the threshold number of participants, a respective set of coefficients of the first polynomial obfuscated with a generator value;
obtaining a respective set of coefficients of the respective polynomial generated by each respective participant, the respective set of coefficients being obfuscated with the generator value; and
verifying, for each respective participant, that the respective participant has generated their respective private key share correctly by:
determining a first candidate value based on the respective data item, obtained from that participant, obfuscated with the generator value;
determining a second candidate value based on the respective set of obfuscated coefficients obtained from that respective participant; and
verifying that the first candidate value corresponds to the second candidate value.

Statement 8. The method of any preceding statement, wherein each participant has a respective ephemeral private key share, and wherein the first message-independent component and/or the first message-dependent component is based on a first ephemeral private key share.

Statement 9. The method of statement 8, wherein each participant has a respective shared value based on an ephemeral public key corresponding to the ephemeral private key, and wherein the first message-independent component is based on the shared value.

Statement 10. The method of any preceding statement, wherein the first ephemeral private key share is generated using the joint secret sharing scheme for generating a share of the ephemeral private key.

Statement 11. The method of statement any preceding statement, wherein the first message-independent component is generated based on an inverse corresponding to the first ephemeral private key share.

Statement 12. The method of statement 11, wherein generating the inverse of the first ephemeral private key share comprises:

generating an intermediate value based on the ephemeral private key and a first blinding key; and generating the inverse of the first ephemeral private key share based on an inverse of the intermediate value and a first blinding key share of the first blinding key.

The intermediate value is the product of the ephemeral private key and the first blinding key.

Statement 13. The method of statement 12, wherein the first blinding key share is generated using the joint secret sharing scheme for generating a share of the first blinding key.

Statement 14. The method of statement 12 or statement 13, wherein the intermediate value is generated by generating a first multiplicative key share based on the first ephemeral private key share and the blinding key share;

obtaining a respective multiplicative key share from at least the threshold number of participants; and generating the intermediate value based on the first multiplicative key share and each of the respective multiplicative key shares.

Note that in some examples, the threshold number of participants required to generate a multiplicative key share is different from the threshold number of participants required to generate the private key share. E.g. the private key has a threshold t+1 and the multiplicative key share needs 2t+1.

Statement 15. The method of statement 14, comprising transmitting the first multiplicative key share to at least each of the threshold number of participants.

Statement 16. The method of any preceding statement, wherein message-independent component is generated based on a second blinding key share of a second blinding key.

Statement 17. The method of statement 16, wherein the second blinding key share is generated using the joint secret sharing scheme for generating a share of the second blinding key.

Statement 18. The method of statement 11 or any statement dependent thereon, wherein the first message-independent component is generated based on a first pre-signature share, wherein the first pre-signature share is generated based on:

a first intermediary share, the first intermediary share being generated based on the first private key share and the inverse corresponding to the first ephemeral private key share; and a respective intermediary share obtained from at least the threshold number of participants.

Statement 19. The method of statement 11 when dependent on any of statements 1 to 17, wherein the first message-independent component is generated based on a first pre-signature share, wherein the first pre-signature share is generated based on:

a first intermediary share, the first intermediary share being generated based on the first private key share and the first blinding key share;

a respective intermediary share obtained from at least the threshold number of participants.

Statement 20. The method of statement 19, wherein the first pre-signature share is generated based on the inverse corresponding to the first ephemeral private key share.

Statement 21. The method of any of statements 18 to 20, wherein the first intermediary share is generated based on the second blinding key share.

Statement 22. The method of any of statements 18 to 21, wherein the first pre-signature share is generated based on the shared value.

Statement 23. The method of statement 22, wherein the first intermediary share is generated based on the shared value.

Statement 24. The method of either statement 18 or statement 19, or any statement dependent thereon, comprising transmitting the first intermediary share to at least the threshold number of participants.

Statement 25. The method of any preceding statement, comprising generating a plurality of different instances of the message-independent component.

Statement 26. The method of any preceding statement, comprising generating a plurality of different instances of the first ephemeral private key shares.

Statement 27. The method of statement 25 or statement 26, comprising generating a plurality of different instances of the first blinding key share and/or the second blinding key share.

Statement 28. The method of either statement 18 or statement 19, or any statement dependent thereon, comprising generating a plurality of different instances of the first pre-signature shares.

Statement 29. The method of any preceding statement, comprising obtaining the message from the coordinator.

Statement 30. The method of any of statements 1 to 28, comprising generating the message.

Statement 31. The method of any preceding statement, wherein the message is a hash of a second message.

Statement 32. The method of any preceding statement, wherein said causing of the first signature share to be made available to the coordinator comprises at least one of:

transmitting the first signature share to the coordinator;

broadcasting the first signature share to one or more of the threshold number of participants.

Statement 33. The method of any preceding statement, wherein said causing of the first message-independent component to be made available to the coordinator comprises at least one of:

transmitting the first message-independent component to the coordinator;

broadcasting the first message-independent component to one or more of the threshold number of participants.

Statement 34. A computer-implemented method of generating a digital signature of a message, wherein a threshold number of different signature shares from respective participants of a group of participants are required to generate the digital signature, wherein each participant has a respective private key share, the method being performed by a coordinator and comprising:

obtaining at least a threshold number of respective message-independent components, wherein each respective message-independent component is generated based on a respective private key share;

obtaining at least the threshold number of respective signature shares, wherein each respective signature share is based on at least a respective message-dependent component, and wherein each respective message-dependent component is generated based on the message; and generating the signature of the message based on each of the obtained signature shares and each of the obtained message-independent components.

A respective message-independent component may form part of the respective signature share.

Generating the signature may comprise interpolating the signature shares.

Note that in some instances, the signature may be a component of an ECDSA signature.

Statement 35. The method of statement 34, wherein each respective signature share is based on the respective message-independent component.

Statement 36. The method of statement 34, comprising:

generating a common message-independent component based on each of the obtained message-independent components; and generating the signature based on the common message-independent component.

Statement 37. The method of any of statements 34 to 36, wherein each participant has a respective ephemeral private key share, and wherein each respective message-independent component and/or message-dependent component is based on a respective ephemeral private key share.

Statement 38. The method of statement 37, wherein each participant has a shared value based on an ephemeral public key corresponding to the ephemeral private key, and wherein each respective message-independent component is based on the shared value.

Statement 39. The method of any of statements 34 to statement 38, comprising transmitting the message to one, some or all of the participants in the threshold number of participants.

Statement 40. The method of any of statements 34 to statement 39, comprising transmitting a request for a respective signature share to at least the threshold number of participants.

Statement 41. The method of any of statements 34 to statement 40, comprising generating one of the obtained signature shares.

Statement 42. The method of any of statements 34 to 41, comprising outputting the signature.

Statement 43. The method of statement 42, wherein outputting the signature comprises:

transmitting the signature to one or more parties; and/or recording the signature on a digital medium; and/or making the signature available to the public.

Statement 44. The method of any preceding statement, wherein the message comprises at least part of a blockchain transaction.

The message may instead comprise one of: at least part of a document (e.g. a legal document), a digital certificate, a medical prescription, or a financial instrument.

Statement 45. The method of any preceding statement, wherein the threshold number of participants is less than the total number of participants in the group of participants.

Statement 46. Computer equipment comprising:

memory comprising one or more memory units; and processing apparatus comprising one or more processing units, wherein the memory stores code arranged to run on the processing apparatus, the code being configured so as when on the processing apparatus to perform the method of any of statements 1 to 45.

Statement 47. A computer program embodied on computer-readable storage and configured so as, when run on computer equipment of statement 46, to perform the method of any of statements 1 to 45.

According to another aspect disclosed herein, there may be provided a method comprising the actions of the first participant and the coordinator.

According to another aspect disclosed herein, there may be provided a system comprising the computer equipment of the first participant and the coordinator.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of participating in a threshold signature scheme for generating a digital signature $(r, s)$ of a message m, wherein the digital signature comprises an r value and an s value, wherein a threshold number of different shares of the s value generated by respective participants of a group of participants are required to generate the s value of the digital signature, wherein each participant has a respective private key share $a_i$ of a private key a corresponding to a public key P that is usable to validate the digital signature, wherein each participant has a respective ephemeral private key share $k_i$ of an ephemeral private key k, and wherein the method is performed by a first one of the participants and comprises:

prior to obtaining the message m, generating a first message-independent component of a first share $s_i$ of the s value, wherein the first message-independent component is generated as a function of a first private key share $a_i$ of the private key a but not as a function of the message m, after obtaining the message m, generating a first message-dependent component of the first share $s_i$ of the s value, wherein the first message-dependent component is generated as a function of a cryptographic hash of the message m, wherein the first message-independent component and/or the first message-dependent component is also generated as a function of a first ephemeral private key share $k_i$ of the ephemeral private key k, and causing a first signature share $s_i$ to be made available to the coordinator, wherein the first signature share $s_i$ is generated as a function of the first message-independent component and the first message-dependent component, and wherein the coordinator is configured to generate the signature based on each of at least the threshold number of respective signature shares $s_i$, each respective signature share s; being generated by a respective participant and being generated as a function of a respective message-independent component and a respective message-dependent component, the respective message-independent component being generated by the respective participant as a function of the respective private key share $a_i$ of the private key a and the respective message-dependent component being generated by the respective participant as a function of the cryptographic hash of the message m, wherein the respective message-independent component and/or the respective message-dependent component is also generated as a function of a respective ephemeral private key share $k_i$ of the ephemeral private key k.

2. The method of claim 1, wherein the first private key share is generated using a joint secret sharing scheme for generating a share of a first private key.

3. The method of claim 2, wherein the first ephemeral private key share is generated using the joint secret sharing scheme for generating a share of the ephemeral private key.

4. The method of claim 1, wherein the first value is generated based on an inverse corresponding to the first ephemeral private key share.

5. The method of claim 4, wherein generating the inverse of the first ephemeral private key share comprises:

generating an intermediate value based on the ephemeral private key and a first blinding key; and generating the inverse of the first ephemeral private key share based on an inverse of the intermediate value and a first blinding key share of the first blinding key.

6. The method of claim 5, wherein the first blinding key share is generated using a joint secret sharing scheme for generating a share of the first blinding key.

7. The method of claim 5, wherein the intermediate value is generated by:

generating a first multiplicative key share based on the first ephemeral private key share and the first blinding key share;

obtaining a respective multiplicative key share from at least the threshold number of participants; and generating the intermediate value based on the first multiplicative key share and each of the respective multiplicative key shares.

8. The method of claim 5, wherein the second value is generated based on a second blinding key share of a second blinding key.

9. The method of claim 8, wherein the second blinding key share is generated using a joint secret sharing scheme for generating a share of the second blinding key.

10. The method of claim 4, wherein the second value is generated based on a first pre-signature share, wherein the first pre-signature share is generated based on:

a first intermediary share, the first intermediary share being generated based on the first private key share and the inverse corresponding to the first ephemeral private key share; and a respective intermediary share obtained from at least the threshold number of participants.

11. The method of claim 5, wherein the second value is generated based on a first pre-signature share, wherein the first pre-signature share is generated based on:

a first intermediary share, the first intermediary share being generated based on the first private key share and the first blinding key share; and a respective intermediary share obtained from at least the threshold number of participants.

12. The method of claim 11, wherein the first pre-signature share is generated based on the inverse corresponding to the first ephemeral private key share.

13. The method of claim 10, wherein the first intermediary share is generated based on a second blinding key share.

14. The method of claim 10, wherein the first pre-signature share is generated based on the shared value.

15. The method of claim 14, wherein the first intermediary share is generated based on the shared value.

16. The method of claim 1, wherein the message comprises at least part of a blockchain transaction.

17. The method of claim 1, wherein the threshold number of participants is less than a total number of participants in the group of participants.

18. Computer equipment comprising:

memory comprising one or more memory units; and processing apparatus comprising one or more processing units, wherein the memory stores code arranged to run on the processing apparatus, the code being configured so as when run on the processing apparatus, the processing apparatus performs a method of participating in a threshold signature scheme for generating a digital signature $(r, s)$ of a message m, wherein the digital signature comprises an r value and an s value, wherein a threshold number of different shares of the s value generated by respective participants of a group of participants are required to generate the s value of the digital signature, wherein each participant has a respective private key share $a_i$ of a private key a corresponding to a public key P that is usable to validate the digital signature, wherein each participant has a respective ephemeral private key share $k_i$ of an ephemeral private key k, and wherein the method is performed by a first one of the participants and comprises:

prior to obtaining the message m, generating a first message-independent component of a first share $s_i$ of the s value, wherein the first message-independent component is generated as a function of a first private key share $a_i$ of the private key a but not as a function of the message m, after obtaining the message m, generating a first message-dependent component of the first share $s_i$ of the s value, wherein the first message-dependent component is generated as a function of the message m, wherein the first message-independent component and/or the first message-dependent component is also generated as a function of a first ephemeral private key share $k_i$ of the ephemeral private key k, and causing a first signature share $s_i$ to be made available to the coordinator, wherein the first signature share $s_i$ is generated as a function of the first message-independent component and the first message-dependent component, and wherein the coordinator is configured to generate the signature based on each of at least the threshold number of respective signature shares $s_i$, each respective signature share $s_i$ being generated by a respective participant and being generated as a function of a respective message-independent component and a respective message-dependent component, the respective message-independent component being generated by the respective participant as a function of the respective private key share $a_i$ of the private key a and the respective message-dependent component being generated by the respective participant as a function of the message m, wherein the respective message-independent component and/or the respective message-dependent component is also generated as a function of a respective ephemeral private key share $k_i$ of the ephemeral private key k.

19. A computer program embodied on computer-readable storage and configured so as, when run on computer equipment, to perform a method of participating in a threshold signature scheme for generating a digital signature $(r, s)$ of a message m, wherein the digital signature comprises an r value and an s value, wherein a threshold number of different shares of the s value generated by respective participants of a group of participants are required to generate the s value of the digital signature, wherein each participant has a respective private key share $a_i$ of a private key a corresponding to a public key P that is usable to validate the digital signature, wherein each participant has a respective ephemeral private key share $k_i$ of an ephemeral private key k, and wherein the method is performed by a first one of the participants and comprises:

prior to obtaining the message m, generating a first message-independent component of a first share $s_i$ of the s value, wherein the first message-independent component is generated as a function of a first private key share $a_i$ of the private key a but not as a function of the message m, after obtaining the message m, generating a first message-dependent component of the first share $s_i$ of the s value, wherein the first message-dependent component is generated as a function of the message m, wherein the first message-independent component and/or the first message-dependent component is also generated as a function of a first ephemeral private key share $k_i$ of the ephemeral private key k,

and causing a first signature share $s_i$ to be made available to the coordinator, wherein the first signature share $s_i$ is generated as a function of the first message-independent component and the first message-dependent component, and wherein the coordinator is configured to generate the signature based on each of at least the threshold number of respective signature shares $s_i$, each respective signature share $s_i$ being generated by a respective participant and being generated as a function of a respective message-independent component and a respective message-dependent component, the respective message-independent component being generated by the respective participant as a function of the respective private key share $a_i$ of the private key a and the respective message-dependent component being generated by the respective participant as a function of the message m, wherein the respective message-independent component and/or the respective message-dependent component is also generated as a function of a respective ephemeral private key share $k_i$ of the ephemeral private key k.

* * * * *